(12) United States Patent
Hui et al.

(10) Patent No.: US 10,200,446 B2
(45) Date of Patent: Feb. 5, 2019

(54) METHOD AND SYSTEM TO ESTIMATE USER DESIRED DELAY FOR RESOURCE ALLOCATION FOR MOBILE CLOUD APPLICATIONS

(71) Applicant: Deutsche Telekom AG, Bonn (DE)

(72) Inventors: Pan Hui, Kowloon (CN); Shengkai Zhang, Kowloon (CN); Christoph Peylo, Damme (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/120,761

(22) PCT Filed: Mar. 5, 2015

(86) PCT No.: PCT/EP2015/054630
§ 371 (c)(1),
(2) Date: Aug. 23, 2016

(87) PCT Pub. No.: WO2015/135834
PCT Pub. Date: Sep. 17, 2015

(65) Prior Publication Data
US 2016/0381116 A1 Dec. 29, 2016

(30) Foreign Application Priority Data
Mar. 10, 2014 (EP) .................................. 14158553

(51) Int. Cl.
*H04L 29/08* (2006.01)
*H04L 29/06* (2006.01)
*H04W 24/02* (2009.01)
*H04W 88/02* (2009.01)

(52) U.S. Cl.
CPC .............. *H04L 67/04* (2013.01); *H04L 67/10* (2013.01); *H04L 67/1097* (2013.01); *H04L 67/306* (2013.01); *H04L 69/02* (2013.01); *H04W 24/02* (2013.01); *H04W 88/02* (2013.01)

(58) Field of Classification Search
CPC ....... H04L 67/04; H04L 67/10; H04L 67/306; H04L 69/02; H04W 24/02; H04W 88/02
USPC ....... 709/205, 204, 226, 201, 203, 219, 230; 455/418, 424, 446, 403, 410, 411, 412.1, 455/420, 421, 422.1, 425
See application file for complete search history.

(56) References Cited

U.S. PATENT DOCUMENTS

| 8,656,284 | B2 | 2/2014 | Ivanyi et al. | |
| 2010/0306249 | A1* | 12/2010 | Hill | G06F 17/30867 707/769 |
| 2011/0004574 | A1 | 1/2011 | Jeong et al. | |
| 2011/0225299 | A1 | 9/2011 | Nathuji et al. | |
| 2012/0287769 | A1* | 11/2012 | Saleem | H04M 9/082 370/201 |

(Continued)

*Primary Examiner* — Inder P Mehra
(74) *Attorney, Agent, or Firm* — Leydig, Voit & Mayer, Ltd.

(57) ABSTRACT

A method for user-desired delay estimation for mobile-cloud applications includes: collecting, by a mobile device, data for a mobile application using at least one of sensors, an application logger and a user feedback module of the mobile device; inferring, by the mobile device, a quality of experience based on the collected data; determining, by the mobile device, a desired delay based on the inferred quality of experience; and offloading, by the mobile device, a task to a cloud together with the desired delay.

14 Claims, 6 Drawing Sheets

(56) References Cited

U.S. PATENT DOCUMENTS

| | | | |
|---|---|---|---|
| 2013/0138798 A1 | 5/2013 | Gohad et al. | |
| 2013/0324161 A1* | 12/2013 | Rhoads | G01C 21/20 |
| | | | 455/456.3 |
| 2014/0223525 A1* | 8/2014 | Fadida | H04L 63/083 |
| | | | 726/6 |
| 2015/0026625 A1* | 1/2015 | Yang | G06F 3/04842 |
| | | | 715/773 |
| 2015/0100991 A1* | 4/2015 | Risberg | H04L 67/104 |
| | | | 725/80 |
| 2015/0146611 A1* | 5/2015 | Joshi | H04W 28/0231 |
| | | | 370/328 |
| 2015/0375113 A1* | 12/2015 | Justice | A63F 13/355 |
| | | | 463/42 |
| 2018/0198732 A1* | 7/2018 | Karthikeyan | H04L 47/805 |

* cited by examiner

METHOD AND SYSTEM TO ESTIMATE USER DESIRED DELAY FOR RESOURCE ALLOCATION FOR MOBILE CLOUD APPLICATIONS

CROSS-REFERENCE TO RELATED APPLICATIONS

This application is a U.S. National Phase application under 35 U.S.C. § 371 of International Application No. PCT/EP2015/054630, filed on Mar. 5, 2015, and claims benefit to European Patent Application No. EP 14158553.9, filed on Mar. 10, 2014. The International Application was published in English on Sep. 17, 2015 as WO 2015/135834 A1 under PCT Article 21(2).

FIELD

The invention relates to a method and system for user desired delay estimation for mobile-cloud applications and a method and system for resource allocation.

BACKGROUND

The popularity of smartphones, 3G/4G devices, tablets and other advanced mobile devices surged in the world. Together with widespread cellular networks and WiFi access, mobile devices have brought rich mobile applications to users. However, the resource-limited nature of mobile devices has hindered further developments for mobile services.

To improve mobile applications and services, various solutions based on offloading tasks to the powerful cloud have been proposed. Rather than conducting all operations locally, the cloud takes advantage of the abundant resources to provide better services (store, process) for mobile devices. Therefore, mobile applications determine some computational-intensive or energy-consuming tasks or methods to be sent to the cloud for processing.

Among many performance metrics to the quality of services of applications, application delay is especially interesting. Intuitively, users always desire online services with delay being as short as possible. Due to the best-effort nature of the Internet, it is very difficult and expensive to provide hard delay guarantees for applications. Therefore, to provide a soft delay guaranteed service has attracted attention for researchers and commercial companies. A soft delay guarantee makes a best-effort attempt to achieve a delay goal. Recent work (Ravindranath, Lenin and Padhye, Jitendra and Mahajan, Ratul and Balakrishnan, Hari: Timecard: controlling user-perceived delays in server-based mobile applications, Proceedings of SOSP, 2013) proposed a method to provide a soft delay guarantee. Ravindranath et al. measure the elapsed time and predict the application delay. With the predicted delay, the system makes a best-effort attempt to control the delay close to a somehow predetermined desired delay by adjusting the allocated resource in the cloud. U.S. 2013/0138798 A1 relates to a cloud computing environment, and, in particular, to determine and monitor quality of resources available for provisioning to the cloud computing environment.

SUMMARY

In an embodiment, the present invention provides a method for user desired delay estimation for mobile-cloud applications. The method includes: collecting, by a mobile device, data for a mobile application using at least one of sensors, an application logger and a user feedback module of the mobile device; inferring, by the mobile device, a quality of experience based on the collected data; determining, by the mobile device, a desired delay based on the inferred quality of experience; and offloading, by the mobile device, a task to a cloud together with the desired delay.

BRIEF DESCRIPTION OF DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Exemplary embodiments of the present invention provide a method and system for user desired delay estimation for mobile-cloud applications and a method and system for resource allocation.

According to one aspect of the present invention, a method for user desired delay estimation for mobile-cloud applications is provided, wherein the method comprises the steps of collecting data for a mobile application using at least one of sensors, an application logger and a user feedback module of a mobile device, inferring quality of experience based on the collected data, determining a desired delay by taking the quality of experience and optionally some additional statistical data based on the collected data into account, and offloading a task to the cloud together with the corresponding desired delay.

Preferably, the quality of experience (QoE) is measured based on subjective ratings from users, e.g., by using the graphic Self-Assessment Manikin (SAM) to collect the subjective ratings.

Furthermore, the collected data preferably comprises subjective and objective data. The subjective data includes at least one of refreshment frequency and refresh time stamp from a user interaction feedback module. The objective data includes at least one of locations, network access, signal strength, system running time, active time stamp, and offloading delay from sensors and an application logger.

Preferably, determining the desired delay applies non-parametric methods and more preferably decision tree or K-nearest neighbor classifier or linear discrimination or multilayer perceptions or support vector machine either as a two-class classification or a multiple class classification.

In another aspect of the present invention a method for resource allocation is provided, wherein the method comprises the steps of receiving a task to be executed along with a corresponding desired delay from a mobile device, determining a resource allocation strategy based on the desired delay and the task to be processed, and executing the task using the allocated resources and sending the result to the mobile device.

Preferably, the step of determining a resource allocation strategy further comprises determining whether the desired delay can be met with the current resources. Optionally, the desired delay is disregarded and the task may still be executed with the available resources, if the desired delay cannot be met.

More preferably, determining of a resource allocation strategy is based on a self-learning process, wherein processing time on server analysis, delay estimation, elapsed time measurement and a table mapping the delay to resource allocation are used.

Furthermore, the self-learning process may change the items of the table mapping the delay to resource allocation according to the feedback of server processing time.

In yet another aspect of the present invention, a method is provided which includes a combination of any of the above-mentioned features on the side of the mobile device and on the side of the cloud.

In another aspect of the present invention, a system for user desired delay estimation for mobile-cloud applications is provided, wherein the system comprises a mobile device, an application framework on the mobile device, that is configured to collect data from a mobile application using at least one of sensors, application logger and user feedback module of the mobile device, to infer the quality of experience for users using the collected data, to estimate a desired delay based on the inferred quality of experience, and to offload a task to the cloud together with a corresponding desired delay.

Preferably, the mobile device further comprises a GPS module and a WiFi module configured to collaborate for outdoor and for indoor localization.

More preferably, the system further comprises a database memory configured to store therein records linking to user registrations including at least one of user's activities, locations, signal strength, system running time, network access, active time stamp, offloading delay, quality of experience.

Furthermore, the mobile device may be configured to remotely access the server.

In another aspect of the present invention a system for resource allocation is provided, wherein the system comprises at least one server containing abundant computing resources being configured to receive a task to be executed along with a corresponding desired delay from a mobile device, to determine a resource allocation strategy based on the desired delay and the task to be processed, to execute the task using the allocated resources and to send the result to the mobile device.

Preferably, the at least one server is configured to self-learn and update the resource allocation strategy based on delay feedback.

More preferably, the at least one server is further configured to send deny of service messages to the application framework on mobile devices when the server does not have enough resources to support the desired delay. Optionally, the task may still be executed with the remaining resources, when the desired delay cannot be executed.

In yet another aspect of the present invention, a system is provided which includes a combination of any of the above-mentioned features of the system for user desired delay estimation and the system for resource allocation.

According to another aspect of the present invention, a method for user desired delay estimation and resource allocation for mobile-cloud applications is provided, wherein the method comprises a user desired delay estimation method, which is used to estimate user's desired delay, and a resource allocation method, which is used to allocate the resource.

Preferably, the user desired delay estimation method comprises any of the respective above mentioned features and the resource allocation method comprises any of the respective above mentioned features.

According to another aspect of the present invention a system for user desired delay estimation and resource allocation for mobile-cloud applications is provided, wherein the system comprises a user desired estimation module, configured to support user desired delay estimation methods in order to estimate user's desired delay, and a resource allocation module, configured to support resource allocation methods in order to allocate the resource.

Preferably the user desired estimation module comprises any of the respective above described features and the resource allocation module comprises any of the respective above mentioned features.

Exemplary embodiments of the present invention optimize the resource allocation with respect to the quality of user experience, and compromise the delay and user's experience.

More specifically, exemplary embodiments of the present invention allow for compromising the delay and resource allocation based on quality of experience being highly contrived. For example, an image search application returns all images containing the user's face. Different users have different satisfying delays. User A does not need the result very soon so that he puts the mobile device into his pocket. While user B cannot wait to get the result, he checks the processing frequently. Apparently, the quality of experience between user A and B will be different with the same application delay. Therefore, applications could have their own desired delay for different users. To this end, intelligently determining a suitable desired delay is an attractive solution to compromise the delay and resource allocation. In the above example, user A could tolerate longer delay. Thus, when the computing resource is limited, the system allocates fewer resources for user A and more for user B to satisfy both of them. The present invention provides a system and method to dynamically determine a desired delay for users in order to maximize the overall quality of user's experience.

Thus, exemplary embodiments of the invention provide a system for desired delay estimation of mobile applications. The system may include two components on the application and the cloud. First, the system dynamically determines a suitable desired delay for users using machine-learning and second controls the application delay to be close to the desired delay. Preferably the system collects subjective and objective data through a feedback mechanism and sensors. Using the collected data, the machine-learning block outputs a desired delay. The application sends the desired delay along with the offloading request to the cloud and the system components in the cloud control the application delay to be close to the desired delay by adjusting the resource allocation strategy.

To adjust the resource allocation in the cloud, one can control the application delay and accomplish a task faster by allocating more resources and vice versa. However, there is a trade-off between delay and user's interest: longer delay drops the population of users due to poor user experience while shorter delay decreases service capacity due to consuming more resources.

A suitable desired delay for each user allows application developers optimally utilize their computing resources such as CPU, memory, etc. The desired delay depends not only on a user's objective parameters but also the user's subjective parameters. Combining these parameters can help to make a decision for adjusting the desired delay based on machine-learning.

The concept of quality of experience (QoE) combines user perception, experience, and expectations with subjective and objective parameters such as application level and network level quality of service (QoS). There are two approaches for measuring QoE: a service level approach (uses statistical samples) and a network management system approach (uses QoS parameters). The system of the present invention combines both approaches in a complementary way.

In an exemplary embodiment, in order to measure the QoE by subjective rating from users the graphic Self-Assessment Manikin is employed to collect subjective rating. Using the measured QoE and other factors (e.g., application running time, user complain frequency, etc.), the system makes a decision whether the desired delay should be increased or decreased based on machine-learning. The application sends the offloading request incorporating the decision on the desired delay to the cloud. Then the cloud coordinates the communication, processes tasks and returns the results.

The system of the present invention is a framework that supports task offloading with dynamic desired delay for mobile-cloud applications. It is advantageous for application developers to create their applications following some principles of the system according to the invention. The principles depend on the implementation, which will be discussed in detail later.

Figure 1:
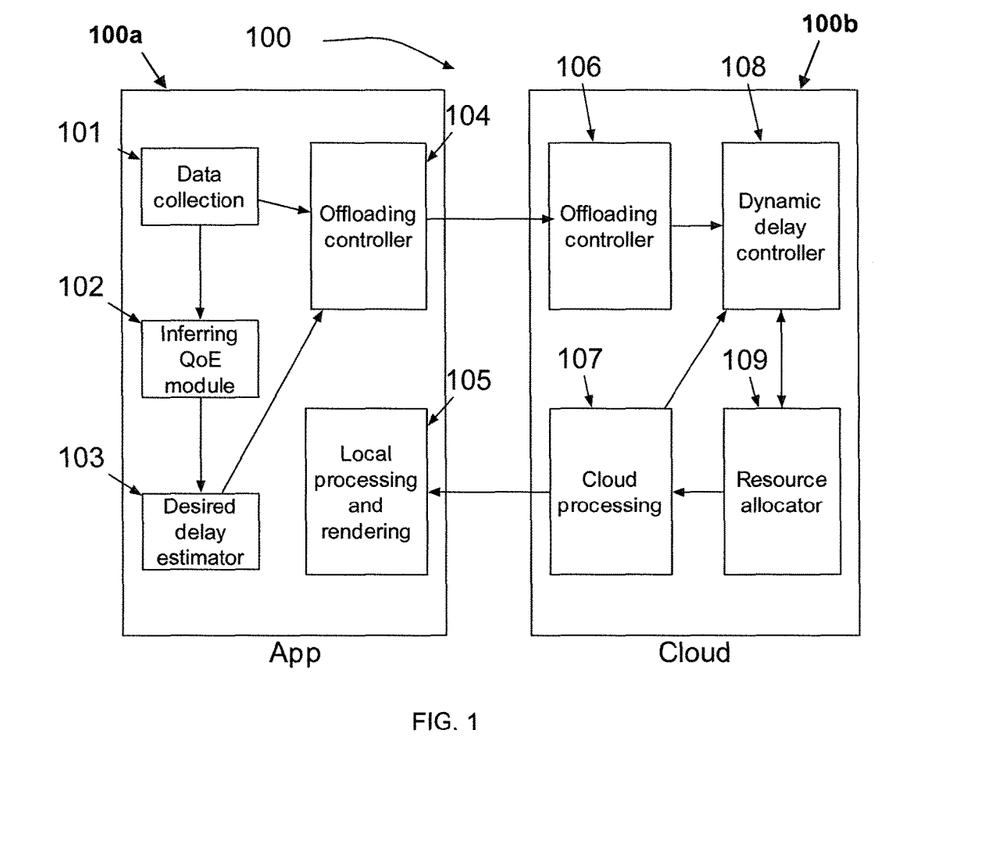
FIG. 1 is a block diagram illustrating an example of an embodiment of a system according to the invention for dynamically estimating desired delay and for determining resource allocation.

FIG. 1 illustrates a system 100 that enables dynamic desired delay. The system 100 comprises a first sub-system 100a which can be a mobile device of a user and a second sub-system 100b which is located in the cloud. The first sub-system 100a comprises a data collection component 101, an inferring Quality of experience component 102, a desired delay estimator 103 and a first offloading controller 104. It further comprises a local processing and rendering component 105. The first sub-system 100a may further comprise components usually present in a mobile device, including, for example, a screen and/or an application interface (not shown).

The first sub-system (or sub-module) 100a collects data through the data collection component 101. Based on the collected data, component 102 infers the QoE of users. QoE is an important parameter to determine the desired delay. The desired delay estimator 103 generates a desired delay based on QoE and some statistical data, i.e. user implicit feedback and subjective rating. The implicit feedback may include a user's interaction with the application interface and a user's free touching behaviors on the screen when running the application.

The first offloading controller 104 makes decisions as to whether to offload execution of a task, or to allow it to continue locally on the mobile device 100a. If the offloading controller 104 decides to offload the task, it sends a request incorporating the desired delay to the cloud 100b for remotely processing the task.

The second sub-system (or sub-module) 100b comprises a second offloading controller 106, a dynamic delay controller 108, a cloud processing component 107 and a resource allocator 109.

The second offloading controller 106 in the cloud receives the request and extracts the desired delay to the dynamic delay controller 108. The dynamic delay controller 108 learns and stores a table mapping desired delay to resource allocation. For example, if it is desired to accomplish a task A within 100 milliseconds, dynamic delay controller 108 searches the table to get an item showing that 100-200 ms for task type A needs 1 CPU and 40 MB memory. Then, dynamic delay controller 108 hands in the resource allocation strategy to the resource allocator 109. The resource allocator allocates resources for processing the task. Finally, the cloud processing component 107 accomplishes the task and sends the result as a response to the mobile device 100a. The local processing and rendering component 105 receives the response and starts to process or render it.

The application running with system 100 preferably provides a feedback mechanism for users. The system (or module) collects user's operations as well as delays to build a model for predicting user's desired delay. Thus, the system makes future decisions on the desired delay according to these data. The system (or module) does not require users to provide subjective surveys; it collects implicit feedback such as a user's operations or interactions with an application. The desired delay prediction is therefore transparent to users in that it does not change the way that users commonly use the application.

Figure 2:
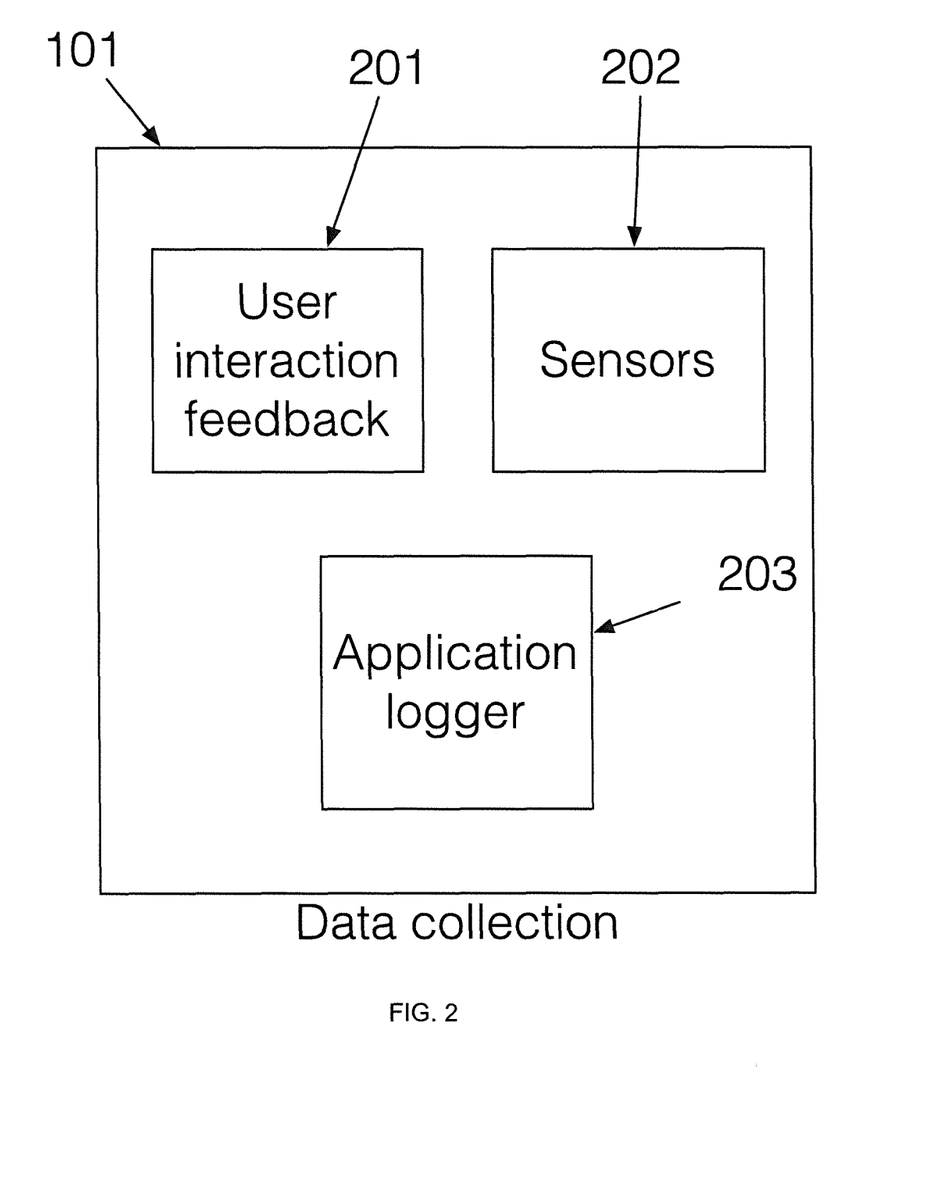
FIG. 2 is a block diagram illustrating an example of an information gathering component in accordance with an aspect of the invention.

FIG. 2 illustrates the data collection component 101 of the system (or module) in accordance with an aspect of the present invention. It collects data from system components, i.e. in this example a user interaction feedback component 201, sensors 202 and an application logger 203. The user feedback component 201 periodically surveys a user's opinion and behavior.

Application developer may set a lot of questions about the application accuracy, interface, etc. Although the survey is very simple, it may not be the most effective way to obtain the data needed. Instead, it may be better to implicitly obtain the subjective parameters by implementing a feedback mechanism, i.e. count user activities. For example, a refresh button for an image processing application can be provided. Thus, the user may get the output of the cloud by pressing the refresh button. The button response may be either the result or an under processing message. By counting the press times for certain periods (e.g., some minutes or hours, one or several days, a week, a month and so on) the refresh frequency can be obtained. The refresh frequency (the ratio of press times and the time period) is capable of inferring a user's QoE. This can be used as a subjective factor in estimating the desired delay. Therefore, user interaction feedback component 201 records the refresh frequency for learning.

Sensors 202 collect objective data such as location, network access, signal strength, etc. Application logger 203 records system running time, active time stamp (the time when user activates the application) and offloading delay. The offloading delay can be used to validate the effectiveness of the system. If the delay is longer than the desired value, the event is recorded as a failure. In contrast, when a too short delay compared with the desired value is detected, the event is recorded as overestimated. Thus, the system tries to allocate more resources for the failure and less for the overestimated.

Data collection component 101 sends the collected data to inferring QoE component 102 for inferring user's QoE. To implement QoE component 102 several existing approaches can be used.

One approach is to connect QoE parameters and QoS parameters through an exponential relationship called IQX hypothesis (Fiedler, Markus and Hossfeld, Tobias and Tran-Gia, Phuoc: A generic quantitative relationship between quality of experience and quality of service, IEEE, Network, volume 24, page 36-41, 2010). The formula relates changes of QoE with respect to QoS to the current level of QoE; it is simple to match, and its limited behaviors are straightforward to interpret. An alternative is to adopt the Likert scale of Mean Opinion Scores (Mok, Ricky KP and Chan, Edmond WW and Luo, Xiapu and Chang, Rocky KC: Inferring the QoE of HTTP video streaming from user-viewing activities, Proceedings of SIGCOMM W-MUST 2011) to assess the QoE based on the collected data.

Figure 3:
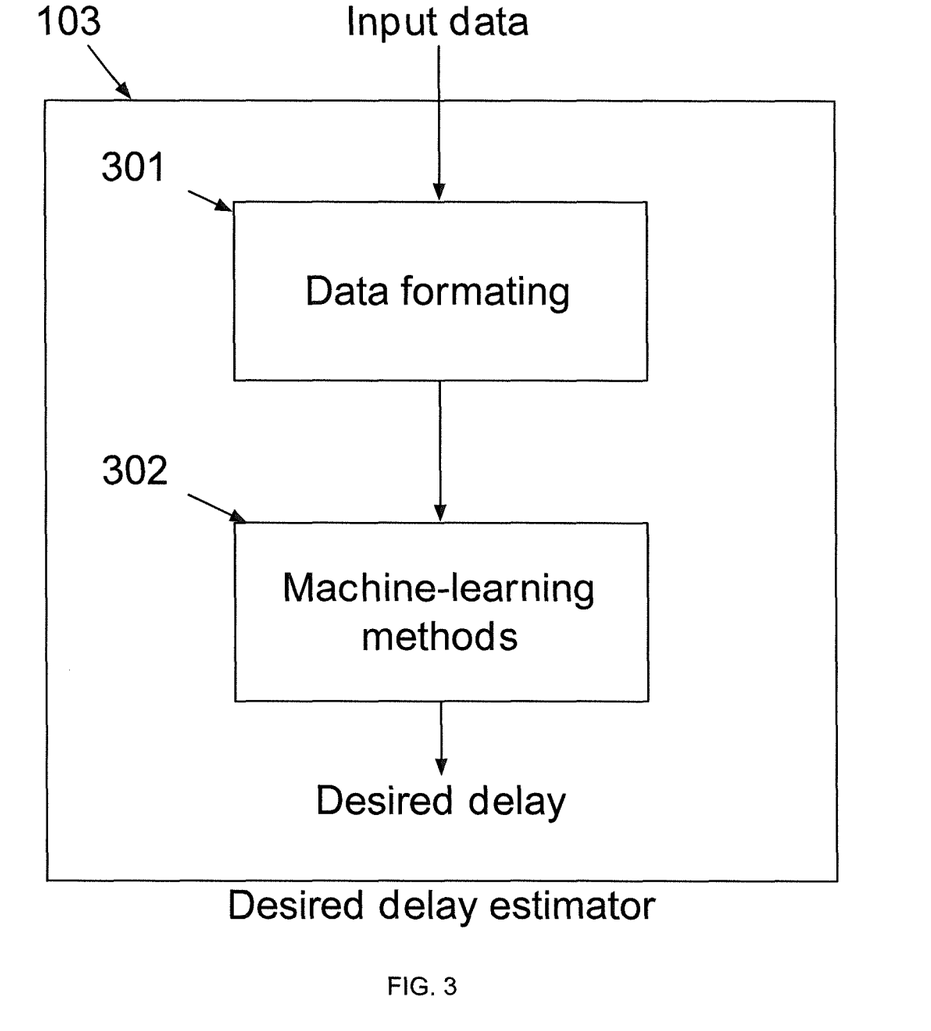
FIG. 3 is a block diagram illustrating an example of a desired delay estimator.

For both approaches, inferring QoE component 102 calculates the QoE directly from QoS parameters (collected by sensors 202). The system will take the QoE, user statistical data (collected by application logger 203) and user's subjective feedback (collected by interaction feedback component 201) to perform a machine-learning method in the desired delay estimator 103.

FIG. 3 illustrates an example of the desired delay estimator 103. The desired delay estimator 103 comprises a data formatting component 301 and a machine-learning component 302. The desired delay estimator 103 receives input data from the inferring QoE component 102. It transmits data (in particular the desired delay) to the first offloading controller 104.

As different machine-learning methods/tools require different data file formats and for a user's convenience and system robustness, data formatting component 301 preferably converts the raw input into different data file formats.

The implementation of the machine learning component 302 is flexible. It depends on the input data features and sizes. QoE and user's subjective feedback are highly contrived. It is difficult to find a probabilistic model fitting the data. Therefore, the system adopts nonparametric methods to learn the data such as decision tree, K-nearest neighbor classifier, linear discrimination, multilayer perceptrons, support vector machine.

For simplicity, a 0-1 classifier (0 means the desired delay should increase, 1 means it should decrease) may be implemented. The increase/decrease step is preferably about 10 milliseconds. It is very easy to extend the two classes (0-1) to multiple classes, e.g. using classifications like very fast, fast, normal, slow, and very slow with corresponding increase/decrease steps.

An important feature for learning is the QoE, time and the refresh record. In a training stage, desired delay estimator 103 may assigns label 0 (increase the delay) by default. When the user presses the refresh button and an under processing message is returned (meaning the task has not been accomplished in the cloud), desired delay estimator 103 labels the current decision 1. For example, desired delay estimator 103 collects and maintains a recent week's data as the training data set. Later, desired delay estimator 103 makes the increase/decrease decision using the training data.

When increasing the desired delay, the system may set an upper bound as the delay with minimum resource processing. When decreasing the desired delay, the system may be set to a standard delay (depends on tasks) if the current desired delay is greater than the standard delay. The system decreases the desired delay, for example by 10 milliseconds, if the current desired delay is less than or equal to the standard delay.

The first offloading controller 104 can be implemented by existing techniques such as ThinkAir (Kosta, Sokol and Aucinas, Andrius and Hui, Pan and Mortier, Richard and Zhang, Xinwen. Thinkair: Dynamic resource allocation and parallel execution in the cloud for mobile code offloading, Proceedings of INFOCOM, 2012), MAUI (Cuervo, Eduardo and Balasubramanian, Aruna and Cho, Dae-ki and Wolman, Alec and Saroiu, Stefan and Chandra, Ranveer and Bahl, Paramvir. MAUI: making smartphones last longer with code offload, Proceedings of MobiSys, 2010) or CloneCloud (Chun, Byung-Gon and Ihm, Sunghwan and Maniatis, Petros and Naik, Mayur and Patti, Ashwin. Clonecloud: elastic execution between mobile device and cloud, Proceedings of EuroSys, 2011). The controller decides whether to offload execution of a particular method, or to allow it to continue locally on the mobile device. The decision depends on data collected about the current environment as well as that learnt from past executions. As an example, ThinkAir implementation is chosen here.

When a task is encountered for the first time, it is unknown to the first offloading controller 104 and so the decision is based only on environmental parameters such as network quality: for example, if the connection is of type WiFi, and the connectivity is strong, the controller is likely to offload the task. On a low quality connection, the task is likely to be executed locally. The controller combines the desired delay and the offload request and sends both to the cloud if it decides to offload.

The second offloading controller 106 is to manage client (mobile device 100*a*) connections. If the client application is unknown to the application server, the second offloading controller 106 retrieves the application from the client, and loads any required class definitions and native libraries. It also responds to application-level ping messages sent by the first offloading controller 104 to measure connection latency. Following the initial connection set up, the server waits to receive execution requests from the client.

Figure 4:
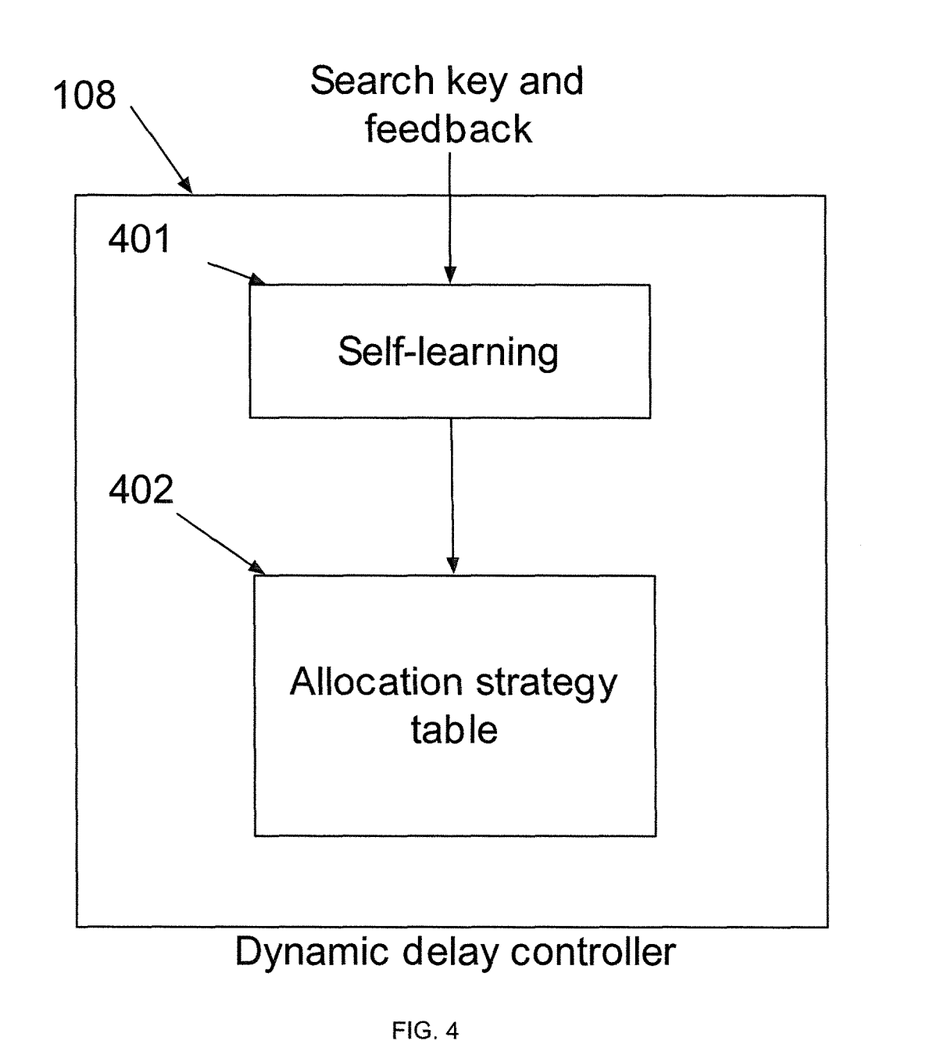
FIG. 4 is a block diagram illustrating an example of a desired delay controller.

FIG. 4 illustrates an example of a dynamic delay controller 108. The dynamic delay controller 108 comprises a self-learning component 401 and an allocation strategy table component 402. The dynamic delay controller 108 receives input data, such as search keys from the second offloading controller 106 and feedback from the cloud processing component 107.

The dynamic delay controller 108 learns from historical statistic data and determines a suitable resource allocation strategy based on the desired delay. Initially, the table in the dynamic delay controller 108 contains only one item: mapping the default desired delay value to a resource allocation strategy. The default desired delay is unknown actually because initially the system has no knowledge of the processing load for different types of applications. Therefore, the system simply sets a default resource allocation strategy for all applications.

The dynamic delay controller 108 self-learns the delay by the feedback of the cloud processing component 107, which is the processing time on the server for the task. However, the server processing time is only one part of the application delay. One way to implement the dynamic delay controller 108 is using the existing technique Timecard (Ravindranath, Lenin and Padhye, Jitendra and Mahajan, Ratul and Balakrishnan, Hari: Timecard: controlling user-perceived delays in server-based mobile applications, Proceedings of SOSP, 2013). It provides two abstractions: the first returns the time elapsed since the user started the request, and the second returns an estimate of the time it would take to transmit the response from the server to the client and process the response at the client. With these abstractions, the server can adapt its processing time to control the end-to-end delay for the request exploiting resource allocation techniques. With the feedback of the cloud processing component 107 and the measured time elapsed, the dynamic delay controller 108 may learn a resource allocation strategy for the future, recording the corresponding delay of the resource allocation strategy. The strategy may be updated accordingly.

The resource allocator 109 may be implemented by existing resource allocation techniques. To make the cloud infrastructure easily maintainable and to keep the execution environment homogeneous, a virtualization environment is typically used, allowing the system to be deployed where needed. There are many suitable virtualization platforms available, e.g., Xen, QEMU and VirtualBox. It is preferable to pre-configure a few types of VMs (virtual machines) in common use so that the resource allocation to tasks can be managed in terms of different types of VMs. This is more efficient and effective. For example, the system can have 4 types of VMs with different configurations of CPU and memory: (1 CPU, 256 MB), (1 CPU 512 MB), (2 CPU, 1024 MB) and (4 CPU, 1024 MB). When the dynamic delay controller 108 asks for 2 CPU and 512 MB memory, the resource allocator 109 allocates 2 VMs with 1 CPU and 256 MB memory.

If the remaining resource cannot satisfy a new coming allocation strategy, the resource allocator 109 sends back a warning signal to the dynamic delay controller 108 showing that it fails to allocate the resource. Then the dynamic delay controller 108 will change the allocation strategy accordingly. In other words, if the desired delay cannot be met with the remaining resources the system might send a deny-of-service message to the application framework of the mobile device. For example, a task would require 3 CPUs and 100 MB memory to meet the desired delay. However, the cloud can only provide 1 CPU and 10 MB memory. Then the server sends a deny message to the mobile device. Next, the cloud disregards the desired delay and tries in a best effort approach to execute the task without the desired delay guarantee. The cloud may reallocate resources for next requests depending on the overall desired delay situation for all users.

The cloud processing component 107 is responsible for executing tasks. It coordinates VMs and combines results as an output. Finally, it sends the output as a response to the local processing and rendering component 105. After receiving the response, the local processing and rendering component 105 processes and renders the result in the response. The process and render method depends on the corresponding processes.

Figure 5:
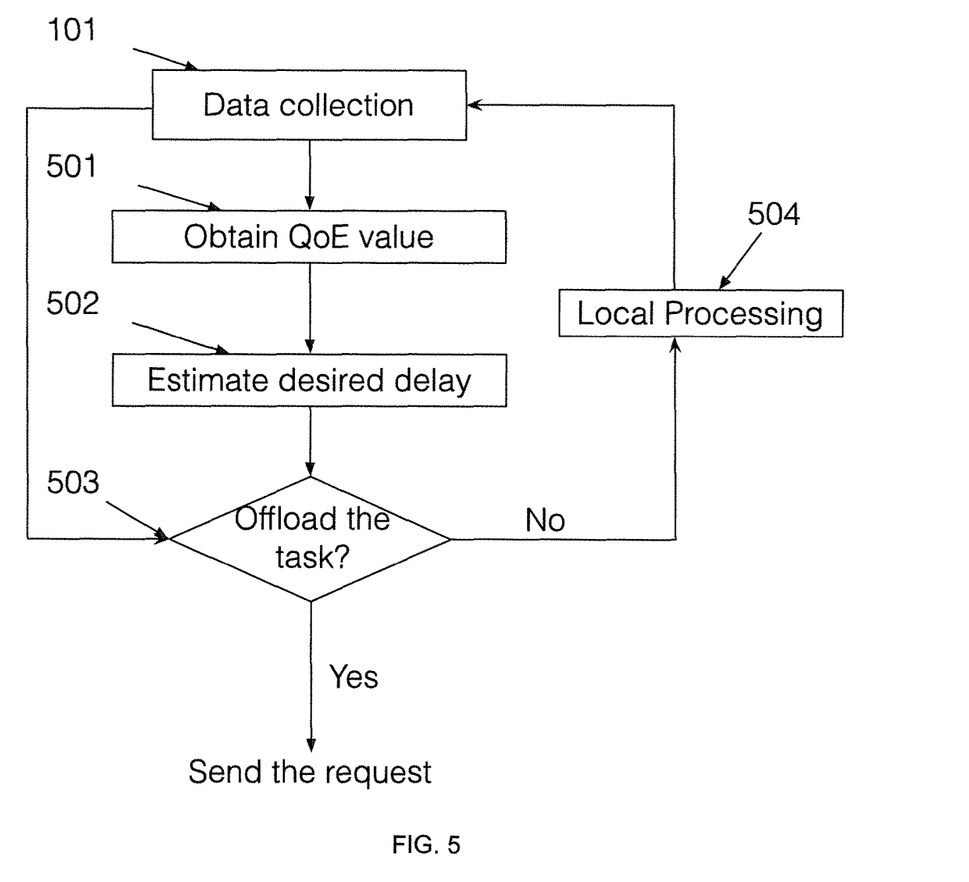
FIG. 5 is a flow chart for illustrating an exemplary process flow relative to a mobile device.

FIG. 5 illustrates the workflow of applications using the first sub-system (or sub-module) 100a in mobile devices. The data collection component 101 collects data from application logger (e.g., application running time, application delay, i.e. the desired delay, request time, response time), sensors (e.g., location, light, temperature, noise), and user interaction feedback (e.g., refresh time, shutdown time, reactivate time). Using the output of the data collection component 101, step 501 obtains the QoE through the inferring QoE component 102. Step 502 activates the desired delay estimator. Then step 503 makes a decision whether to offload the task or to process locally with the data from the data collection component 101 and the output of step 502. The first offloading controller 104 sends the offloading request to the cloud and waits for the response as long as the decision is yes. Otherwise, step 504 activates local processing and returns some statistical data to the data collection component 101 for future work.

Figure 6:
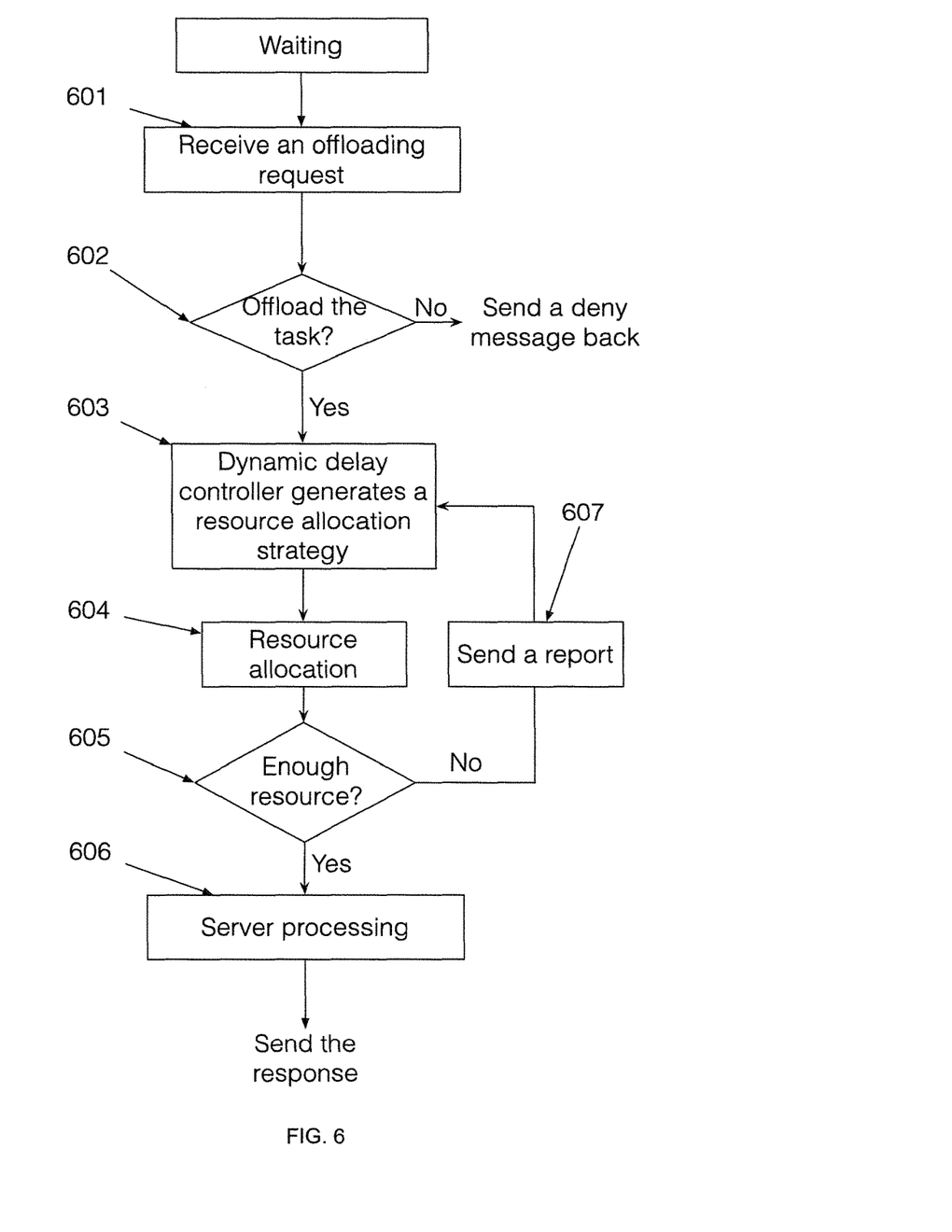
FIG. 6 is a flow chart for illustrating an exemplary process flow relative to the cloud.

FIG. 6 illustrates the workflow of the second sub-system 100b in the cloud. Initially, the server is waiting for a request. Step 601 receives and extracts the request. Step 602 makes a decision whether to offload or to reject the request based on the current state of the cloud such as the remaining resource, and/or network problems and so on. If no, the second offloading controller 106 sends a reject reply to the mobile device. If yes, step 603 uses the desired delay to search for a resource allocation strategy as the output. If no such item can be obtained, step 603 selects a default allocation strategy. Step 604 receives the output of step 603, and then deploys different types of VMs based on the use of resource allocation techniques. By checking the remaining resource, step 605 is to confirm the feasibility of resource allocation strategy. If it is not feasible due to inadequate resources, step 607 sends a report to the dynamic delay controller 108 for changing the resource allocation strategy and updating the table. If it is feasible, step 606 activates the allocated VMs and processes the tasks. Finally, the cloud processing component 107 sends the calculated result back to the mobile devices.

A mobile-cloud system that can estimate user desired delay for mobile-cloud applications is provided. Furthermore, a method that can collect data reflecting user experience is provided. The method can learn from the collected data to determine a suitable desired delay. Application developers can maximize overall user experience by adjusting the resource allocation to meet the desired delay of users.

What has been described above includes examples of the present invention. It is not possible to describe every conceivable combination of components or methodologies for purposes of describing the subject of the invention, but one of ordinary skill in the art may recognize that many further combinations and permutations of the invention are possible. The foregoing detailed description has described only a few of many possible implementations of the present invention. The detailed description is intended by way of illustration, not by way of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for user desired delay estimation for mobile-cloud applications, wherein the method comprises:
   collecting, by a mobile device, data for a mobile application using sensors, an application logger, and/or a user feedback module of the mobile device;
   inferring, by the mobile device, a quality of experience based on the collected data;
   determining, by the mobile device, a desired delay based on the inferred quality of experience, wherein the desired delay corresponds to an amount of time for completing the offloaded task; and
   offloading, by the mobile device, a task to a cloud together with an indication of the desired delay.

2. The method of claim 1, wherein the collected data comprises subjective and objective data;
   wherein the subjective data includes information from the user feedback module relating to a refreshment frequency and/or a refresh time stamp; and
   wherein the objective data includes information from the sensors and the application logger relating to locations, network access, signal strength, system running time, active time stamp, and/or offloading delay.

3. The method of claim 1, wherein determining the desired delay includes:
   applying nonparametric methods.

4. A method for resource allocation, wherein the method comprises:
   receiving, by a system comprising at least one server having computing resources, a task to be executed along with an indication of a corresponding desired delay :from a mobile device, wherein the corresponding desired delay corresponds to an amount of time for completing the task;
   determining, by the system, a resource allocation strategy for the computing resources of the at least one server based on the task to be executed and the corresponding desired delay; and
   executing, by the system, the task using allocated resources of the at least one server and sending a result to the mobile device.

5. The method of claim 4, wherein determining the resource allocation strategy further comprises:
   determining whether the desired delay can be met with current resources.

6. The method of claim 4, wherein determining the resource allocation strategy is further based on a self-learning process utilizing processing time, delay estimation, elapsed time measurement and a table mapping delay to resource allocation.

7. The method of claim 6, wherein the self-learning process changes items of the table mapping delay to resource allocation based on feedback relating to server processing time.

8. A system for user desired delay estimation for mobile-cloud applications, wherein the system comprises:
   a mobile device programmed with an application framework;
   wherein the application framework is configured to:
   collect data for a mobile application using sensors, an application logger and/or a user feedback module of the mobile device;
   infer a quality of experience using the collected data;
   estimate a desired delay based on the inferred quality of experience, wherein the desired delay corresponds to an amount of time for completing the offloaded task; and
   offload a task to a cloud together with an indication of the desired delay.

9. The system of claim 8, wherein the mobile device further comprises:
   a GPS module and a WiFi module configured to collaborate for outdoor and for indoor localization.

10. The system of claim 8, wherein the system further comprises:
    a database memory configured to store records linking to user registrations including user activities, locations, signal strength, system running time, network access, active time stamp, offloading delay, and/or quality of experience.

11. The system of claim 8, wherein the mobile device is configured to remotely access a server.

12. A system, comprising:
    at least one server comprising computing resources and being configured to:
    receive a task to be executed along with an indication of a corresponding desired delay from a mobile device, wherein the corresponding desired delay corresponds to an amount of time for completing the task;
    determine a resource allocation strategy for the computing resources of the at least one server based on the task to be executed and the corresponding desired delay;
    execute the task using allocated resources of the at least one server; and
    send a result to the mobile device.

13. The system of claim 12, wherein the at least one server is further configured to self-learn and update a manner of determining the resource allocation strategy based on delay feedback.

14. The system of claim 12, wherein the at least one server is further configured to send a denial of service message to mobile device when the at least one server does not have enough resources to support the corresponding desired delay.

* * * * *